United States Patent [19]

Aldape et al.

[11] 3,730,556

[45] May 1, 1973

[54] CAMPER HITCH EXTENSION

[76] Inventors: Tony M. Aldape; Frank Aldape, both of 4121 Hill Road, Boise, Idaho 83702

[22] Filed: Sept. 23, 1971

[21] Appl. No.: 182,998

[52] U.S. Cl. ............280/500, 280/491 R, 280/164 R, 296/23 MC, 280/482
[51] Int. Cl. .............................................. B60d 1/06
[58] Field of Search ...................... 280/491 B, 164 R, 280/482, 491 E, 495; 296/23 UC

[56] References Cited

UNITED STATES PATENTS

| | | | |
|---|---|---|---|
| 2,531,859 | 11/1950 | Mock | 280/491 B |
| 2,649,308 | 8/1953 | Bice, Jr. | 280/164 R |
| 2,818,276 | 12/1957 | Sprang | 280/482 |
| 3,542,414 | 11/1970 | Nelson | 296/23 MC |
| 3,547,480 | 12/1970 | Ward | 296/23 MC |
| 3,580,613 | 5/1971 | Northrop | 280/164 R |

*Primary Examiner*—Leo Friaglia
*Attorney*—John W. Kraft

[57] ABSTRACT

A trailer hitch extension for truck-mounted campers having rearward portions cantilevered with respect to the truck, comprising: a step-bracket member having a forwardly disposed bracket plate operable to mount the hitch extension to the lowermost rearward terminal end of the camper and a rearwardly disposed step portion operable to provide a step-like means to the camper, both suitably disposed respectively from an upstanding riser wall of the step-bracket member; and a drawbar assembly pivotally dependingly carried by the step-bracket member and being provided with a ball hitch coupler at the forwardmost terminal end of the drawbar operable to detachably fasten said drawbar to a commonly known ball-hitch disposed at the midpoint of the rearwardmost terminal end of the truck, a carrier means disposed at a point midway on the lowermost terminal edge of the step portion of the step-bracket member operable to permit articulation of the drawbar laterally and vertically, and a ball hitch platform disposed at the rearwardmost terminal end of the drawbar.

4 Claims, 4 Drawing Figures

TONY M. ALDAPE  INVENTOR.
FRANK ALDAPE

PATENTED MAY 1 1973 3,730,556

TONY M. ALDAPE   INVENTOR.
FRANK ALDAPE

BY

CAMPER HITCH EXTENSION

FIELD OF INVENTION

The present invention relates to towing hitch extensions, and more particularly to towing hitch extensions including step-bracket means operable in combination with truck-mounted campers having cantilevered rearward portions.

DESCRIPTION OF THE PRIOR ART

Towing hitch extension means, as commonly employed in the art, have comprised outwardly projecting drawbars carried by various types of frame members suitably mounted on the chassis of the motor vehicle. These frame members have included chassis extension bars and a variety of pivotally mounted drawbar support means fastened to various configurations of articulating support frames. These hitches can not be properly said to be camper hitch extension apparatus because the drawbar carrier framing means is fastened directly to the chassis of the truck and is, therefore, chassis extension means. These chassis extension frames are limited by the length of span which the frame will permit. The length of span is limited because the truck and camper are commonly carried largely independent of each other. A truck adapted for rearwardly cantilevered campers, not employed as a camper carrier, is limited for further uses because a hitch extension frame either cannot be removed or can be removed only with great effort.

Accordingly, it is an object of the present invention to provide means operable for towing hitch extensions to accommodate rearwardly cantilevered truck-mounted campers, and step means for access to the campers.

Another object of this invention is to provide means operable to provide longitudinal support to the camper to prevent rearward movement of the camper with respect to the truck.

It is a further object of the towing hitch extension to provide means operable to detachably connect said extension means to a commonly known hitching ball which may be provided on a truck.

These and other objects shall become apparent from the description following, it being understood that modifications may be made without affecting the teachings of the invention here set out.

SUMMARY OF THE INVENTION

Generally, the present invention comprises a trailer hitch extension for truck-mounted campers having rearward portions cantilevered with respect to said truck, comprising: a step-bracket member having a forwardly disposed bracket plate operable to mount said hitch extension to the lowermost rearward terminal end of said camper and a rearwardly disposed step portion operable to provide a step-like means to said camper, both suitably disposed respectively from an upstanding riser wall of the step-bracket member; and a drawbar assembly pivotally dependingly carried by the step-bracket member and being provided with a ball hitch coupler at the forwardmost terminal end of the drawbar operable to detachably fasten said drawbar to a commonly known ball hitch disposed at the midpoint of the rearwardmost terminal end of said truck, a carrier means disposed at a point midway on the lowermost terminal edge of said step portion of the step-bracket member operable to permit articulation of the drawbar laterally and vertically, and a ball hitch platform disposed at the rearwardmost terminal end of the drawbar.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
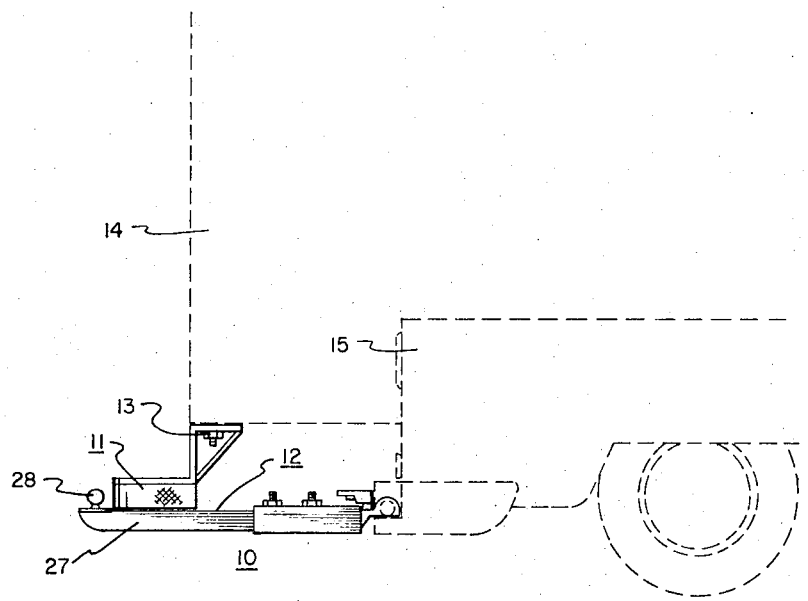
FIG. 1 is a side elevational view of the camper extension hitch of this invention shown with a truck and camper in broken lines for illustrative purposes.

Referring now to the drawings and more particularly to the FIG. 1, the camper hitch extension of the present invention is shown to advantage and identified by the numeral 10. The hitch extension 10 comprises a step-bracket member 11, and a drawbar assembly 12. The step-bracket 11 is fastened by means such as bolts 13 to the lowermost rearward terminal side of a commonly known truck-mounted camper and distally from the rearwardmost terminal end thereof, shown in the drawings by broken lines with its rearwardmost portion cantilevered in respect to the truck. The drawbar assembly 12 is dependently carried on lowermost terminal side of the step- bracket 11 and detachably engages in a manner hereinafter later described a commonly known trailer hitch ball (not shown which may be provided at the midpoint of the rearwardmost bumper of a truck 15, also shown in broken lines. It is understood that in this configuration the hitch extension 10 is operable as an extension means for towing hitches employed with truck-mounted campers, and furthermore as a support means to resist longitudinal movement of the camper 14 with respect to the truck 15.

Figure 2:
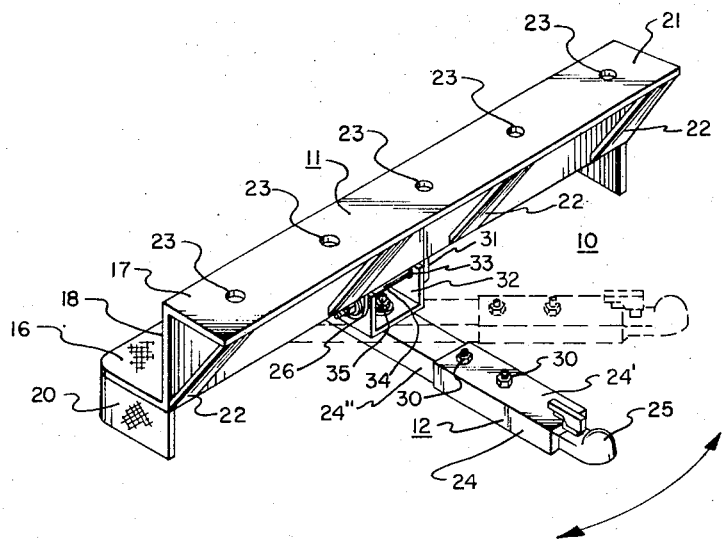
FIG. 2 is a top left front perspective view of the hitch extension showing the step-bracket member and articulating drawbar assembly, and showing the drawbar in a lateral pivotal displacement in broken lines for illustrative purposes.
Figure 3:
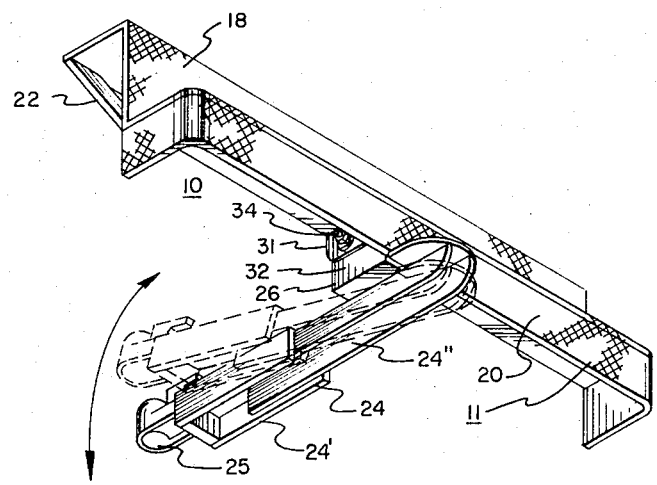
FIG. 3 is a bottom right rear perspective view of the invention of the FIG. 2, showing the drawbar in a vertical pivotal displacement in broken lines for illustrative purposes.
Figure 4:
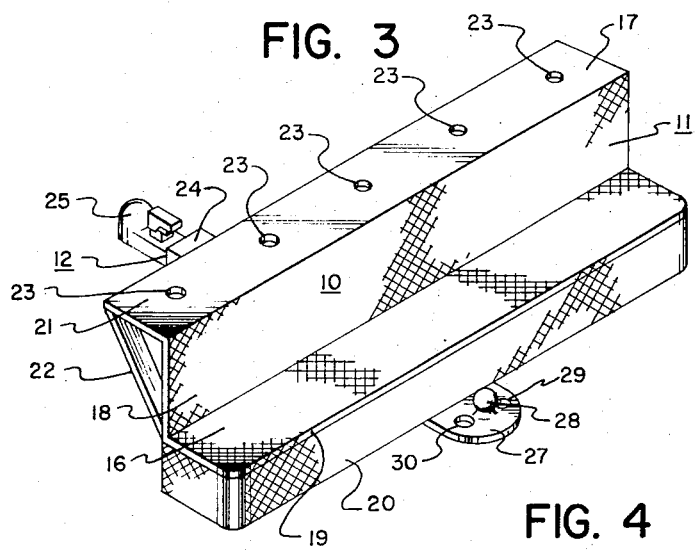
FIG. 4 is a right rear perspective view of the step-bracket member and including the hitching ball platform of the drawbar of this invention.

Referring now to the FIGS. 2, 3, and 4, the step-bracket member 11 includes a rearwardly disposed step portion 16 and a forwardly disposed bracket portion 17, projecting respectively from an upstanding riser wall 18. The step portion 16, provided at the lowermost rearward terminal edge of the riser wall 18, includes a horizontally disposed platform 19 and a bracing bumper 20 disposed along the lowermost rearwardmost terminal edge of the platform 19, as shown to better advantage in FIG. 4. The platform portion 16 is operable as an access step for ingress and egress from the camper 14. The bracing bumper 20 is operable as a limited bumper protection means for the combination of the camper 14 and the truck 15. The platform 19, the bracing bumper 20 and the rearwardmost terminal wall of the riser wall 18 may be provided with skid resistant finish, such as knurling, which would reduce the liklihood of slipping by persons using the step portion 16.

Referring again to FIG. 2, the bracket portion 17 of the step-bracket member 11 comprises a bracket plate 21 and a plurality of bracing struts 22. The bracket 21 is a forwardly horizontally disposed plate fastened to the forwardmost, uppermost terminal edge of the riser wall 18. The bracing struts 22 are disposed at predetermined intervals between the lowermost forward terminal edge of the bracket plate 21 and distally from the lowermost forward terminal edge of the riser wall 18. The bracket plate 21 may be provided with a plurality of holes 23 at predetermined intervals operable to permit mounting of the step-bracket member 11 in a manner set out above.

Referring now to FIGS. 2 and 3, the drawbar assembly 12 includes a drawbar 24, a hitching ball coupler 25, a drawbar carrying means 26, and a hitching ball platform 27. It has been found to advantage in practice to provide means for selectively adjusting the length of the drawbar 24, in which event the draw-bar may comprise a forward receiving member 24', and an rearward carrying member 24''. The forward receiving member 24' is operable to slidably engage the rearward carrying member 24'' and may be slidably adjusted by an adjusting means not shown, such as a rectilinearly disposed slot in the carrying member 24'' and fastened by means of bolts 30 engageable through holes provided in the receiving member 24' and the slot of the carrying member 24''. The drawbar assembly 12 may be provided at the rearwardmost terminal end of the drawbar 24 with a trailer hitching ball platform 27 operable to provide means for projecting a commonly known hitching ball 28 distally from the platform 19 of the carrying member 24''. It has been found to advantage to provide distally from each side of the hitching ball 28 a pair of safety chain holes 29 and 30 operable to engage safety chains and the like commonly used in trailer towing. The drawbar assembly 12 is pivotally carried by an articulating carrier means 31 mounted at a point midway on the lowermost terminal side of step portion 16 of the step-bracket 11. The carrier 31 comprises a substantially U-shaped carrier member 32 carried on the step-bracket 11 by a pair of eyes 33 dependently fastened to the step portion 16 on either outer terminal side of the member 32. The u-shaped member 32 is pivotally carried by an axle means such as a bolt 34 carried in the eyes 33 and the U-shaped member 32 operable to vertically pivot the bolt 34 and the drawbar assembly 12. The U-shaped member 32 at its base leg portion is joined to a point distally from the rearward terminal end of the drawbar assembly 12 by a pivotal axle means, such as vertically disposed bolt 35, operable to laterally pivot the drawbar assembly 12.

During installation, the camper hitch extension 10 may be mounted to the camper 14 as set out above and the drawbar assembly 12 may be raised at the forward terminal end having the hitching ball coupler 25, and horizontally rotated over the trailer hitch ball provided on the truck 15, and locked to the ball of the truck 15 by means of the locking means provided on the coupler 25. It is to be understood that a detachably mounted camper 14, and the hitch extension 10 carried on the camper 14, as set out above, may be removed from the truck 15 by releasing the coupler 25 of the drawbar assembly 2 and lifting the camper 14 away, thereby exposing the hitching ball of the truck 15 for other uses.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

We claim:

1. A trailer hitch extension for truck mounted campers having rearward portions cantilevered with respect to said truck, comprising: a step-bracket member and a drawbar assembly pivotally dependingly carried by said step-bracket member, said step-bracket member having a forwardly disposed bracket plate operable to mount said hitch extension to the lowermost rearward terminal end of said camper, and a rearwardly disposed step portion operable to provide a step-like means to said camper, both suitably disposed respectively from an upstanding riser wall of said step-bracket member; and said drawbar assembly provided with a ball hitch coupler at the forwardmost terminal end of said drawbar operable to detachably fasten said drawbar to a commonly known ball hitch disposed at the midpoint of the rearwardmost terminal end of said truck, a carrier means disposed at a point midway on the lowermost terminal edge of said step portion of said step-bracket member operable to permit articulation of said drawbar laterally and vertically, and a ball hitch platform disposed at the rearwardmost terminal end of said drawbar.

2. The apparatus of claim 1 wherein said skid resistant finish includes knurling.

3. The apparatus of claim 1, wherein said carrier means is a substantially U-shaped carrier member mounted to a pair of dependently disposed eye members fastened distally from either outer terminal side of said U-shaped carrier, and said U-shaped carrier is pivotally joined to said drawbar assembly by an axle means such as vertically disposed bolts operable to laterally pivot said drawbar.

4. The apparatus of claim 1, wherein said drawbar includes adjusting means operable to selectively adjust said drawbar length, said drawbar adjusting means includes a pair of overlapping drawbar channel members which may be fastened by means of bolts engageable in a pair of holes each disposed into the side terminal walls of the outer receiving channel member and a pair of rectilinearly disposed slots each in the terminal side walls of the innermost carrying members of said channel members.

* * * * *